FIG. 1
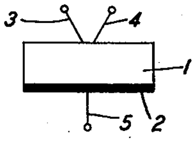
FIG. 2
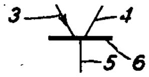
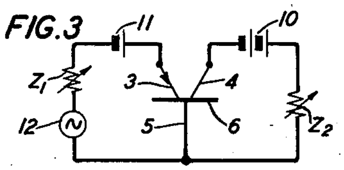
FIG. 4
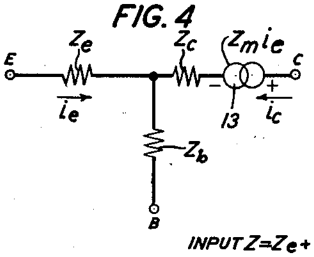
FIG. 5
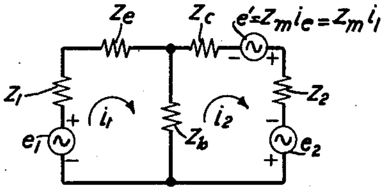
$$\text{INPUT } Z = Z_e + \frac{Z_b(Z_c + Z_2 - Z_m)}{Z_b + Z_c + Z_2}$$
$$\text{OUTPUT } Z = Z_c + \frac{Z_b(Z_e + Z_1 - Z_m)}{Z_b + Z_e + Z_1}$$
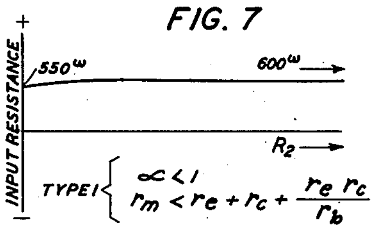
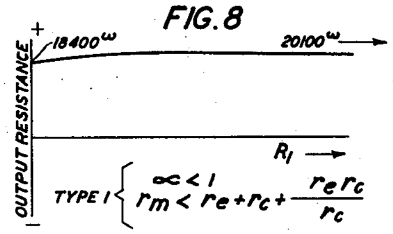
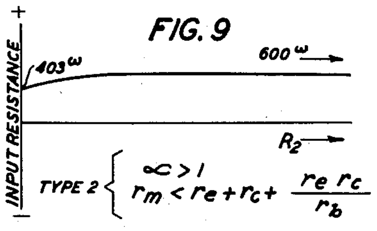
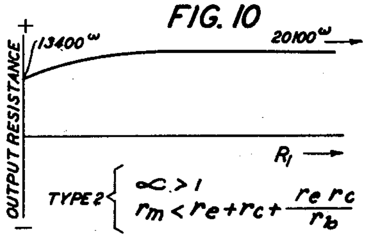
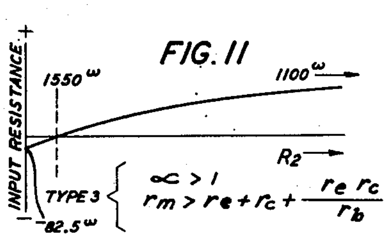
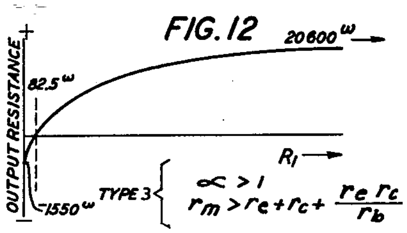
INVENTOR
H. L. BARNEY
BY
Harry C. Hart
ATTORNEY Feb. 12, 1952 H. L. BARNEY 2,585,078

NEGATIVE RESISTANCE DEVICE UTILIZING SEMICONDUCTOR AMPLIFIER

Filed Nov. 6, 1948 6 Sheets-Sheet 2

INVENTOR
H. L. BARNEY
BY Harry C. Hart
ATTORNEY $$\text{INPUT } Z = Z_b + \frac{Z_e(Z_c+Z_2)}{Z_e+Z_c+Z_2-Z_m}$$

$$\text{OUTPUT } Z = Z_c + \frac{(Z_e-Z_m)(Z_1+Z_b)}{Z_1+Z_b+Z_e}$$

INVENTOR
H. L. BARNEY
BY Harry C. Hart
ATTORNEY $$\text{INPUT } Z = Z_b + \frac{Z_c(Z_e+Z_2)}{Z_e+Z_c+Z_2-Z_m}$$

$$\text{OUTPUT } Z = Z_e + \frac{(Z_1+Z_b)(Z_c-Z_m)}{Z_c+Z_b+Z_1}$$

INVENTOR
H. L. BARNEY
BY Harry C. Hart
ATTORNEY

INVENTOR
H.L. BARNEY
BY Harry C. Hart
ATTORNEY

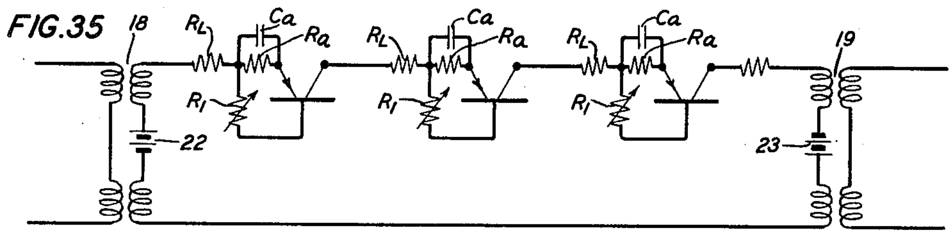
FIG. 36
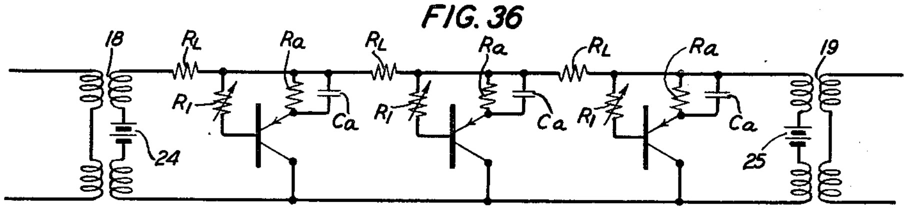
FIG. 37
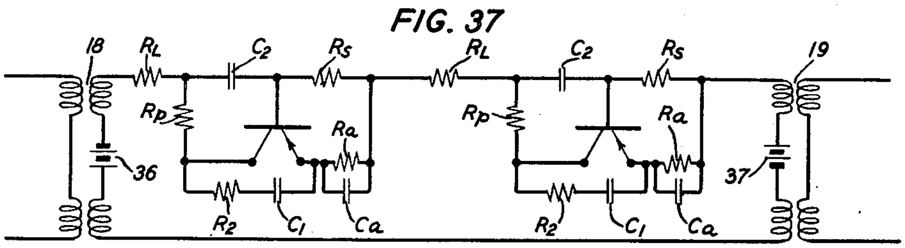
FIG. 38
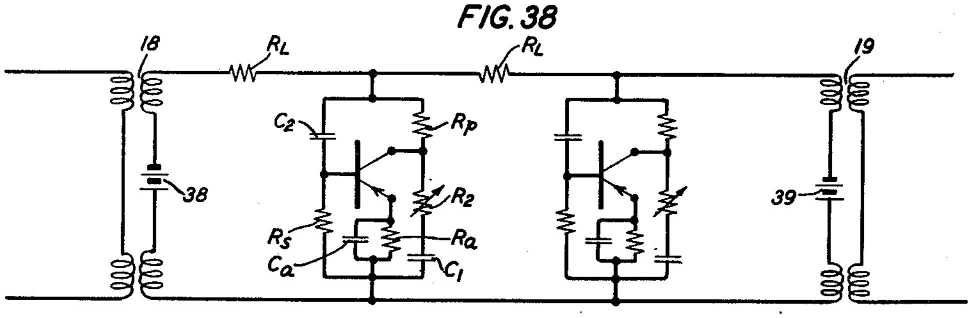
INVENTOR
H. L. BARNEY
BY Harry C. Hart
ATTORNEY Patented Feb. 12, 1952 2,585,078

UNITED STATES PATENT OFFICE 2,585,078

NEGATIVE RESISTANCE DEVICE UTILIZING SEMICONDUCTOR AMPLIFIER

Harold L. Barney, Madison, N. J., assignor to Bell Telephone Laboratories, Incorporated, New York, N. Y., a corporation of New York Application November 6, 1948, Serial No. 58,685

8 Claims. (Cl. 179—171)

This invention relates to signal translation networks utilizing semiconductor amplifiers as active elements.

The principal object of the invention is to adjust the impedance of a two-terminal network utilizing a semiconductor amplifier to a desired negative value.

More particular objects are: to provide negative impedances of series and of shunt types, having improved stability and having characteristics which are readily controllable as to magnitude by adjustment of a circuit parameter such as resistance or an operating bias.

Related objects are to facilitate the construction of transmission line boosters, trigger circuits, oscillators, and other apparatus of which a negative resistance forms a component part.

Application Serial No. 11,165 of John Bardeen and W. H. Brattain, filed February 26, 1948 describes and claims an amplifier unit of novel construction. That application was thereafter abandoned in favor of a continuation-in-part application Serial No. 33,466, filed June 17, 1948, by the same inventors, and the latter application was issued on October 3, 1950, as Patent 2,524,035. The amplifier there described comprises a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an amplified replica of the voltage of the signal source appears across the load. The aforementioned application contains detailed specifications for the fabrication of the device.

The device may take various forms, all of which have properties which are generally similar although they differ in important secondary respects. Examples of such other forms are described and claimed in an application of J. N. Shive, Serial No. 44,241, filed August 14, 1948 and an application of W. E. Kock and R. L. Wallace, Jr., Serial No. 45,023, filed August 19, 1948 and issued July 17, 1951 as Patent 2,560,579.

The device in all of its forms has received the appellation transistor, and will be so designated in the present specification.

In the original Bardeen-Brattain application above referred to, there appears a tabulation of the performance characteristics of three sample transistors. In one of these, it appears that increments of signal current which flow in the circuit of the collector electrode as a result of the signal current increments which flow in the circuit of the emitter electrode exceed the latter in magnitude. This feature of transistors has become the general rule, and appears in nearly all transistors fabricated. It is discussed in detail in the aforementioned continuation-in-part application, now Patent 2,524,035. It is of such importance in connection with the present invention, as well as otherwise, that the ratio of these increments has been given a name, "$\alpha$." In one of its aspects, the present invention deals with transistors in which $\alpha>1$ ($\alpha$ exceeds unity) and is based on the discovery that with a network of which such a device is the active element, the impedance looking into its input or output terminals can, by appropriate control of one of the network parameters, be made to take on values which vary over a much wider range than is possible with the most nearly analogous vacuum tube networks. It will be explained below, in the detailed description of the invention which follows, how it is that the value of a resistor included in the one circuit modifies the impedance of the other circuit.

The invention will be fully apprehended from the following detailed description of certain preferred embodiments thereof, taken in connection with the appended drawings, in which:

Fig. 1 is a schematic diagram of a transistor;

Fig. 2 is a symbolic representation of a transistor as employed in the present specification;

Fig. 3 is a schematic circuit diagram of a transistor amplifier network of the grounded base type;

Fig. 4 is the equivalent circuit of a transistor;

Fig. 5 is the equivalent circuit of the transistor network of Fig. 3;

Figs. 7, 9 and 11 are graphs showing the variation of the input impedance of the network of Fig. 3 with load resistance for three representative types of transistor characteristic;

Figs. 8, 10 and 12 are graphs showing the variation of the output impedance of the network of Fig. 3 with source resistance under the same conditions;

Fig. 35 is a schematic diagram of a transmission line section including a plurality of similar series type transistor network negative resistor boosters connected in series;

Fig. 36 is a schematic diagram of a transmission line section including a plurality of similar series type transistor network negative resistance boosters connected in shunt.

Fig. 37 is a schematic diagram of a transmission line section including a plurality of similar shunt type negative resistance transistor networks connected in series;

Fig. 38 is a schematic diagram of a transmission line section including a plurality of shunt type negative resistance transistor network boosters connected in shunt.

Figure 6:
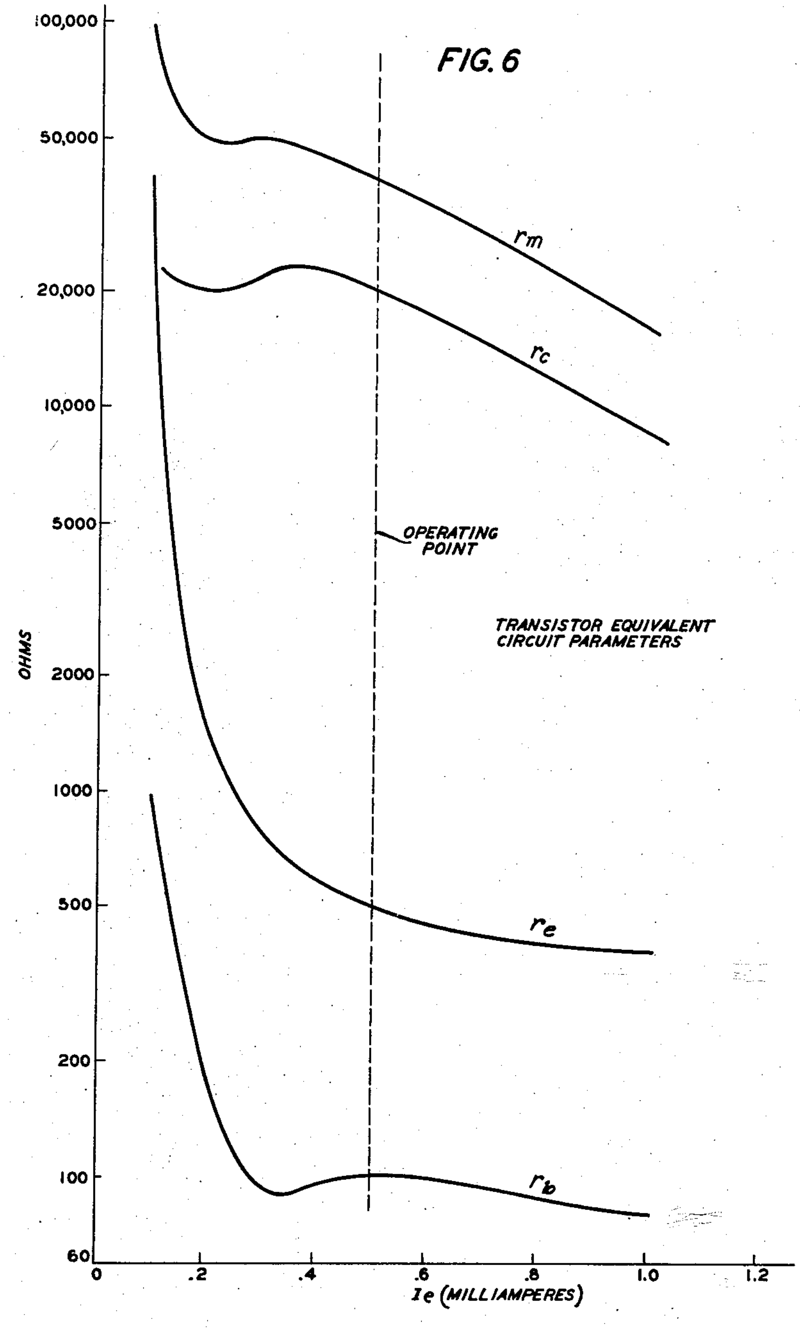
Fig. 6 is a group of graphs showing transistor parameter values as functions of emitter bias current.

In Fig. 1 there is shown a diagrammatic representation of a transistor comprising a block 1 of semiconductor material, having a plated film 2 of metal making low resistance contact with one face, an emitter electrode 3 and a collector electrode 4, making contact close together on the opposite face. A base electrode 5 is connected to the film 2. To simplify the drawings, a symbolic representation, shown in Fig. 2, is used henceforth. In this figure, the emitter 3 is distinguished by an arrowhead which points inward for N-type material, the collector 4 by making contact on the same face of the block as the emitter, and the base electrode 5 by making contact on the opposite face. The short heavy line 6 represents the block itself.

Fig. 3 is a schematic circuit diagram of a transistor amplifier network in which the transistor itself is represented by the symbol of Fig. 2. A bias source 10 of perhaps 40 volts is connected to apply negative bias potential to the collector 4, while another source 11, usually of a fraction of a volt, is connected to apply a small positive bias potential to the emitter 3 (or a small negative bias potential to the base electrode 5, depending upon one's point of view). A load represented by an impedance $Z_2$, which may be variable, is connected in the collector circuit. A signal source 12 is connected in the input circuit, i. e., between the emitter 3 and the base 5. In addition, an external or "source" impedance $Z_1$ is connected in the input circuit. This impedance evidently reduces the signal voltage applied to the input terminals of the transistor, for a given source voltage, but it serves an important purpose as will more fully appear below.

As is now well known, the voltage which appears across the load impedance $Z_2$ contains a component which is an amplified replica of the source voltage. In addition, it is found that in the great majority of transistors, $\alpha$ is so great that the signal frequency component of the collector current exceeds the signal frequency component of the emitter current even when the network load impedance $Z_2$ is of substantial magnitude.

The collector signal current $i_c$, corresponding to a given emitter signal current $i_e$ depends on the collector voltage and on the circuit configuration. Therefore $\alpha$ cannot be exactly specified without specifying these matters. A sufficiently exact definition of $\alpha$ is therefore $$\alpha=\left(\frac{i_c}{i_e}\right)_{V_c=\text{const., grounded base connection}} \quad (1)$$

or, $\alpha$ is equal to the ratio of collector signal current to emitter signal current when the base electrode 5 is common to the input and output circuits and when the collector voltage is held constant. In a network of this configuration in which a constant potential source supplies operating bias to the collector and in which signal frequency collector currents flow through a load impedance $Z_2$ and cause signal frequency changes in the collector voltage, an equivalent definition of $\alpha$, namely, $$\alpha=\lim_{Z_2\to 0}\left(\frac{i_c}{i_e}\right) \quad (2)$$

is more convenient to use.

It is convenient to analyze the performance of transistors for small signal inputs by means of equivalent circuits from which all but the essentials have been eliminated. It has been found that the equivalent circuit which best serves the purpose is a Y or T section of three passive legs which represent the base impedance, the emitter impedance and the collector impedance, respectively, and, in series with the collector leg, a fictitious generator 13 whose electromotive force is proportional to the emitter current. Thus $$e'=Z_m i_e \quad (3)$$

Such an equivalent circuit is shown in Fig. 4. These elements of the equivalent circuit are identified herein as emitter, collector and base impedances, but it is to be understood that an actual impedance measurement between two electrodes of the transistor would not necessarily give the simple sum of the respective two impedances. The values of equivalent circuit elements may be arrived at from such external impedance measurements as follows:

$$Z_e=Z_{11}-Z_{12}$$
$$Z_b=Z_{12}$$
$$Z_c=Z_{22}-Z_{12}$$
$$Z_m=Z_{21}-Z_{12}$$

where $Z_{11}$ is the impedance measured between the emitter and the base with the collector circuit effectively open;

$Z_{22}$ is the impedance measured between the collector and the base with the emitter circuit effectively open;

$Z_{12}$ is the ratio of the signal voltage appearing between the emitter and the base, to the signal current flowing in the collector current when the emitter circuit is effectively open;

$Z_{21}$ is the ratio of the signal voltage appearing between the collector and the base, to the signal current flowing in the emitter circuit when the collector circuit is effectively open.

The assumed directions of current flow and the polarity of the electromotive force of the internal generator 13 are as shown in Fig. 4 for the above measurements.

Fig. 5 is an equivalent circuit corresponding to the transistor amplifier network of Fig. 3, which is of the "grounded base" type; i. e., the base impedance $Z_b$ is common to both meshes, while the emitter impedance $Z_e$ and the collector impedance $Z_c$ are individual to the first and second meshes, which are identified by mesh currents $i_1$ and $i_2$ in the customary manner. Test voltage sources $e_1$ and $e_2$ are connected in the first and second meshes for purposes of analysis.

As with Fig. 4, there appears in series with the collector impedance a source of electromotive force $$e'=Z_m i_e \quad (3)$$

As above stated, the fictitious electromotive force $e'$ which is characteristic of the transistor is found to be substantially proportional to the emitter current $i_e$. The constant of proportionality thus has the dimensions of impedance, is termed a "mutual" impedance, and is designated $Z_m$.

It is of interest to determine the relation which must hold in order that $$\alpha=\lim_{Z_2\to 0}\left(\frac{i_c}{i_e}\right)> \quad (4)$$

The mesh equations of Fig. 5 are $$e_1=(Z_1+Z_e+Z_b)i_1-Z_b i_2 \quad (5)$$

$$e_2+Z_m i_1=-Z_b i_1+(Z_b+Z_c+Z_2)i_2 \quad (6)$$

The foregoing definition (2) of $\alpha$ requires that it be determined when the output terminals of the transistor network are short-circuited for signal frequency currents. Furthermore, for the present purposes, the source can be treated as having no internal resistance. Thus, putting $$\begin{aligned} Z_2&=0\\ e_2&=0\\ Z_1&=0 \end{aligned} \quad (7)$$

and solving the Equations 5 and 6 simultaneously for $i_1$ and $i_2$ gives $$i_1=e_1\frac{Z_b+Z_c}{\Delta} \quad (8)$$

$$i_2=e_1\frac{Z_b+Z_m}{\Delta} \quad (9)$$

where $\Delta$ is the determinant of the coefficients of Equations 5 and 6. But in Fig. 5, $$\begin{aligned} i_c&=i_2\\ i_e&=i_1 \end{aligned}$$

and therefore $$\alpha=\frac{i_c}{i_e}=\frac{i_2}{i_1}=\frac{Z_m+Z_b}{Z_c+Z_b} \quad (10)$$

Tests of a large number of sample transistors have shown that the various impedances of the equivalent circuit are essentially pure resistances except at very high frequencies and that, within this resistive range, representative values are:

$Z_e$=200–800 ohms
$Z_b$=100–600 ohms
$Z_c$=15,000–30,000 ohms
$Z_m$=10,000–50,000 ohms.

Thus both $Z_m$ and $Z_c$ are many times as great as $Z_b$; so that, from Equation 10, to a good approximation, $$\alpha \doteq \frac{Z_m}{Z_c} \quad (11)$$

Though the expressions developed hereinafter for input and output impedances are general, the results which follow will be illustrated with examples involving resistive terminations, and for that part of the frequency scale in which the equivalent circuit parameters are resistive. These parameters, when used in this connection, will be referred to as $r_e$, $r_b$, $r_c$ and $r_m$ instead of $Z_e$, $Z_b$, $Z_c$ and $Z_m$, respectively.

Out of the wide range of possible characteristics available among transistors, the results will be illustrated with three different sets of equivalent circuit parameters. The first, which will arbitrarily be referred to as type 1, satisfies the following conditions $$\alpha<1$$

and $$r_m<r_e+r_c+\frac{r_e r_c}{r_b}$$

To illustrate this type, the following equivalent circuit parameter values are assumed:

$r_e$=500 ohms
$r_b$=100 ohms
$r_c$=20,000 ohms
$r_m$=10,000 ohms

Type 2 characteristics are obtained when the following conditions are met:

$$\alpha>1$$

and $$r_m<r_e+r_c+\frac{r_e r_c}{r_b}$$

Values of equivalent circuit parameters assumed to illustrate this type are:

$r_e$=500 ohms
$r_b$=100 ohms
$r_c$=20,000 ohms
$r_m$=40,000 ohms

Type 3 characteristics are obtained when $$\alpha>1$$

and $$r_m>r_e+r_c+\frac{r_e r_c}{r_b}$$

To illustrate this type, the following values are assumed:

$r_e$=500 ohms
$r_b$=600 ohms
$r_c$=20,000 ohms
$r_m$=40,000 ohms

It is to be understood that while all transistors may be classified according to which of the three foregoing types they conform to, their values of the circuit parameters may vary widely from the particular combinations assumed above. Indeed, the parameters for any one transistor vary with operating condition, as is illustrated on Fig. 6, which shows typical characteristics of $r_e$, $r_b$, $r_c$ and $r_m$ plotted against emitter bias current; i. e., steady current flowing to the emitter electrode ($I_e$). At the operating point of 0.5 milliampere emitter current, it will be seen that $r_e$=500 ohms
$r_b$=100 ohms
$r_c$=20,000 ohms
$r_m$=40,000 ohms which are the values earlier assumed to illustrate the type 2 transistor characteristics. Characteristics for transistors of type 1 and type 3 are similar in their general trends, though particular values of the parameters are numerically different.

Proceeding now to the investigation of the input impedance of the equivalent circuit of Fig. 5, and therefore of the transistor network Fig. 3, put $Z_1=0$ and $e_2=0$ in the foregoing Equations 5 and 6 and solve for $i_1$. The result is $$i_1=\frac{Z_b+Z_c+Z_2}{\Delta}e_1 \qquad (12)$$

where $$\Delta=\begin{vmatrix} Z_e+Z_b & -Z_b \\ -(Z_b+Z_m) & Z_b+Z_c+Z_2 \end{vmatrix} \qquad (13)$$

or $$Z_{in}=\frac{e_1}{i_1}=\frac{\Delta}{Z_b+Z_c+Z_2}=Z_e+\frac{Z_b(Z_c+Z_2-Z_m)}{Z_b+Z_c+Z_2} \qquad (14)$$

By an exactly similar process, putting $$Z_2=0$$
$$e_1=0$$

but allowing $Z_1$ and $e_2$ to remain finite, it turns out that $$Z_{out}=\frac{e_2}{i_2}=Z_c+\frac{Z_b(Z_e+Z_1-Z_m)}{Z_b+Z_e+Z_1} \qquad (15)$$

These more general Equations 14 and 15 may be replaced by the following equations for illustrative purposes:

$$R_{in}=r_e+\frac{r_b(r_c+R_2-r_m)}{r_b+r_c+R_2} \qquad (14a)$$

and $$R_{out}=r_c+\frac{r_b(r_e+R_1-r_m)}{r_b+r_e+R_1} \qquad (15a)$$

assuming $Z_1$ and $Z_2$ to be replaced by $R_1$ and $R_2$.

In transistors of type 1, $\alpha<1$ so that $r_m<r_c$, and both of these expressions give positive values for all values of $R_1$ and $R_2$. The variation of $R_{in}$ and $R_{out}$ with $R_2$ and $R_1$, respectively, is small. The variations of $R_{in}$ and $R_{out}$ are plotted on Figs. 7 and 8 as functions of $R_2$ and $R_1$, respectively for the type 1 transistor whose parameters were given above. The input resistance, as shown in Fig. 7 varies between 550 and 600 ohms for a variation of $R_2$ between zero and infinity and the output resistance, as shown in Fig. 8 varies between 18,400 and 20,100 ohms for variation of $R_1$ between zero and infinity.

In transistors of type 2, $\alpha>1$ but $$r_m<r_e+r_c+\frac{r_e r_c}{r_b} \qquad (16)$$

The variations of $R_{in}$ and $R_{out}$ with $R_1$ and $R_2$ as shown on Figs. 9 and 10 for a transistor of this type are somewhat greater, but both are still positive for all values of $R_1$ and $R_2$.

With the type 3 transistor parameters where $$\alpha>1 \text{ and } r_m>r_e+r_c+\frac{r_e r_c}{r_b} \qquad (17)$$

startling new results are obtained. These are revealed in Figs. 11 and 12, which are plots of input resistance as a function of $R_2$ and of output resistance as a function of $R_1$. It is apparent that both the input resistance and the output resistance pass through zero values, for critical values of $R_2$ and $R_1$, respectively, and are positive for greater values and negative for smaller. Thus there is furnished a transistor network of zero or negative input resistance and a transistor network of zero or negative output resistance. Furthermore, these results are independent of one another, so that they may be obtained separately or together, as desired, within the limitations imposed by stability requirements. It will be evident from inspection of Figs. 11 and 12, that this arrangement is not "short-circuit stable." That is, if both $R_1$ and $R_2$ are zero, the network may break into oscillation because of the negative resistances of the input and output circuits. If $R_1=0$, $R_2$ must be at least 1550 ohms, or if $R_2=0$, $R_1$ must be at least 82.5 ohms to obtain a stable arrangement.

The critical value of $R_2$, for which $R_{in}=0$, is given by $$R_2=\frac{r_b(r_m-r_e)}{r_e+r_b}-r_c \qquad (18)$$

Similarly, the output resistance $R_{out}$ is zero for $$R_1=\frac{r_b(r_m-r_c)}{r_c+r_b}-r_e \qquad (19)$$

Negative values of $R_{in}$ and $R_{out}$ are obtained with values of $R_2$ and $R_1$, respectively, which are less than those given by Equations 18 and 19, while negative values of greatest magnitude are obtained when $R_2$ and $R_1$ are equal to zero.

Transistor networks of the type shown in Fig. 3, in which the input or output resistance has been adjusted in the manner described above to have a zero value, are of use in current measuring instruments. Those in which the resistance has been adjusted to a negative value are of use as negative resistance boosters, as the active elements in oscillators, trigger circuits, and the like.

Figure 13:
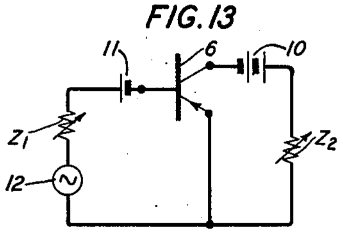
Fig. 13 is a schematic circuit diagram of a transistor amplifier network of the grounded emitter type.
Figure 14:
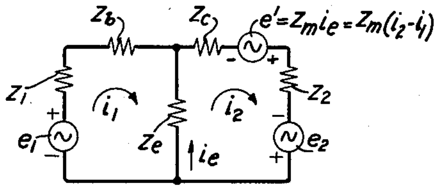
Fig. 14 is the equivalent circuit of Fig. 13.

Fig. 13 shows a transistor connected into a network of the so-called "grounded emitter" type. As shown by the equivalent circuit, Fig. 14, this term means merely that the emitter impedance $Z_e$ is common to the two meshes while the base impedance $Z_b$ and the collector impedance $Z_c$ are individual to the separate meshes. The fictitious electromotive force $e'$ which is characteristic of the transistor is again given by $$E'=Z_m i_e$$

but the emitter current $i_e$ is now replaced by the difference between the mesh currents $i_1$ and $i_2$. Thus $$i_e=i_2-i_1$$

As before, a test voltage source $e_1$ and an input impedance $Z_1$ are connected to the input terminals while a second test voltage source $e_2$ and a load impedance $Z_2$ are connected to the output terminals. Mesh equation analysis of the circuit of Fig. 14 in the manner outlined above gives $$Z_{in}=Z_b+\frac{Z_e(Z_c+Z_2)}{Z_e+Z_c+Z_2-Z_m} \qquad (20)$$

and $$Z_{out}=Z_c+\frac{(Z_e-Z_m)(Z_1+Z_b)}{Z_1+Z_b+Z_e} \qquad (21)$$

Figure 15:
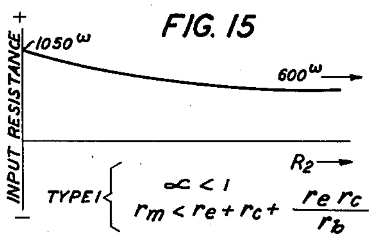
Figs. 15, 17 and 19 are graphs showing the variation of the input impedance of the network of Fig. 13 with load resistance for three representative types of transistor characteristic.
Figure 16:
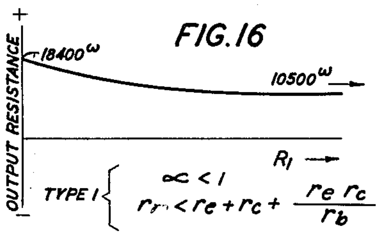
Figs. 16, 18 and 20 are graphs showing the variations of the output impedance of the network of Fig. 13 with source resistance under the same conditions.

These may also be rewritten for frequency ranges which are not too high, as $$R_{in}=r_b+\frac{r_e(r_c+R_2)}{r_e+r_c+R_2-r_m} \qquad (20a)$$

and $$R_{out}=r_c+\frac{(r_e-r_m)(R_1+r_b)}{r_1+r_b+r_e} \qquad (21a)$$

where $Z_1$ and $Z_2$ are replaced by $R_1$ and $R_2$. These latter expressions are plotted as functions of $R_2$ and $R_1$, respectively:

(a) In Figs. 15 and 16 for the illustrative parameter values previously chosen for type 1 transistors, with which $\alpha<1$ and $$r_m<r_e+r_c+\frac{r_e r_c}{r_b}$$

Figure 17:
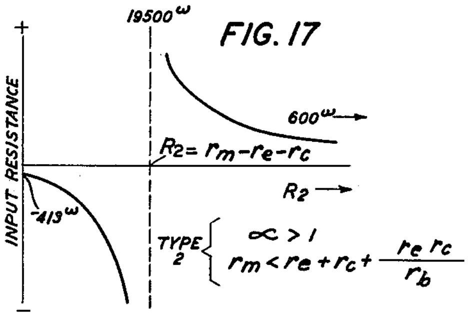
Figure 18:
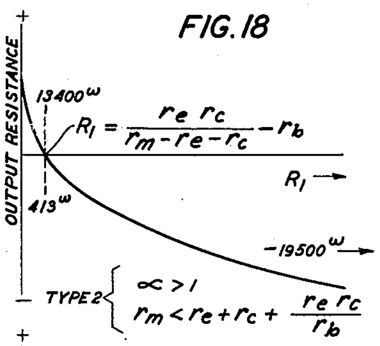

(b) In Figs. 17 and 18 for the illustrative parameter values previously chosen for type 2 transistors with which $\alpha>1$ and $$r_m<r_e+r_c+\frac{r_e r_c}{r_b}$$

Figure 19:
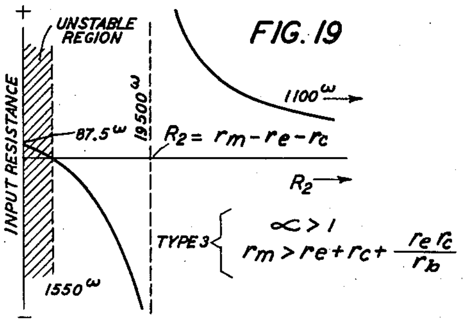
Figure 20:
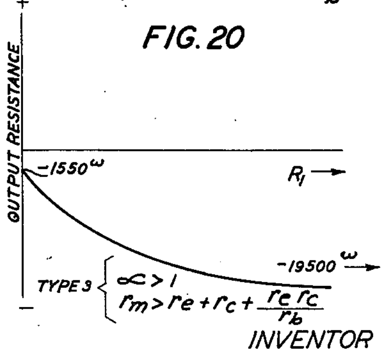

(c) In Figs. 19 and 20 for the illustrative parameter values previously chosen for type 3 transistors, with which $\alpha>1$ and $$r_m>r_e+r_c+\frac{r_e r_c}{r_b}$$

With the type 1 transistor characteristic in which $\alpha<1$, the input and output resistances remain positive for all values of $R_2$ and $R_1$, respectively, though their magnitudes are controllable by adjustment of these resistors.

But when $\alpha>1$, startling results occur. Thus, in Figs. 17 and 19, the input resistance becomes infinite for a load resistance given by $$R_2=r_m-r_e-r_c \qquad (22)$$

being positive for greater values and negative for lesser values. Subject to condition (b) above, these negative values of $R_{in}$ persist for all values of $R_2$ less than that given by (22). Subject to the condition (c) they persist for values of $R_2$ less than that given by (22) and greater than that given by $$R_2=\frac{r_b(r_m-r_e)}{r_b+r_e}-r_c \qquad (23)$$

for which $R_{in}=0$. The proximity, along the $R_2$ axis, of the points for which $R_{in}=0$ and $R_{in}=\infty$, and indeed of the points for which it has large negative and large positive values, makes it a simple matter to vary $R_2$ between these values in any desired manner, and so adapts the network of Fig. 13 when incorporating a transistor of type 3, to use in modulation systems of the so-called absorption modulation type. Referring to Fig. 18, the output resistance for the network with a type 2 transistor is zero at a value of $R_1$ which, from Equation 21*a*, is given by $$R_1=\frac{r_e r_c}{r_m-r_e-r_c}-r_b \qquad (24)$$

being positive for lesser values and negative for greater. For a type 3 transistor, for which $$r_m>r_e+r_c+\frac{r_e r_c}{r_b}$$

the output impedance is always negative, but is variable over a wide range of adjustment of $R_1$.

The network of Fig. 13, when adjusted in the manner described above, is useful for matching impedances, as a negative resistance, as a zero impedance device, and in various other connections.

The negative values of the output impedance of the grounded emitter network of Fig. 13 may also be explained in non-mathematical terms as follows. The collector current returns to the transistor by way of two paths in parallel, namely, the emitter electrode and the base electrode. Evidently, the greater the magnitude of the impedance in series with the base electrode, whether internal to the semiconductor block or external to it, the smaller the fraction of the current which returns by way of the base, and the greater the fraction which returns by way of the emitter. The emitter fraction, when multiplied by the mutual impedance $Z_m$, gives rise to an electromotive force which causes further current to flow out of the collector electrode and divide between the emitter and the base as described above. Thus, an increase of the impedance in series with the base electrode results in an increase of positive feed-back or regeneration. If pushed sufficiently far, i. e., so far as to outweigh the losses due to other resistances in the network, this increase causes instability and the network sings, or breaks into self-oscillation. Such self-oscillation may be restricted to a desired frequency by the judicious employment of a reactive impedance appropriately connected in the network.

The same results, both with respect to regeneration and self-oscillation, also obtained with a network of the grounded base configuration. The amount of the positive feedback from collector to emitter being controllable by adjustment of the magnitude of an impedance element inserted in series with the base electrode. Short of this point at which self-oscillation sets in, this increase of positive feedback results in a very large amplification of a signal applied to the emitter.

Figure 21:
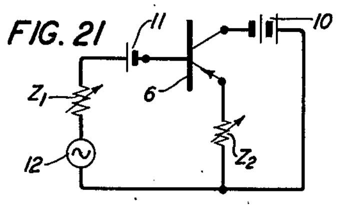
Fig. 21 is a schematic circuit diagram of a transistor amplifier network of the grounded collector type.
Figure 22:
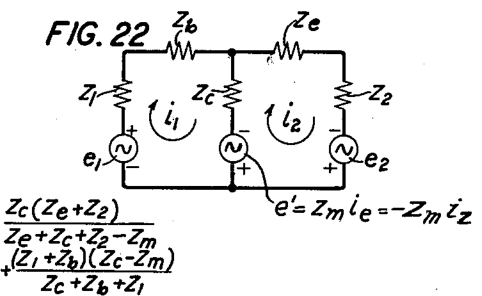
Fig. 22 is the equivalent circuit of Fig. 21.

Fig. 21 shows a transistor connected in a network of the so-called "grounded collector" type. As shown by the equivalent circuit, Fig. 22, this term means merely that the collector impedance $Z_c$ is common to the two meshes while the base impedance $Z_b$ and the emitter impedance $Z_e$ are individual to the separate meshes. The fictitious electromotive force $e'$ which characterizes the transistor performance is again connected in series with $Z_c$ and is given by $$e'=Z_m i_e$$

but in this case $$i_e=-i_2$$

Test voltage sources $e_1$ and $e_2$ and source and load impedances $Z_1$ and $Z_2$ are connected between the input terminals and between the output terminals, as before. Mesh equation analysis of the circuit of Fig. 20 in the manner outlined above gives $$Z_{in}=Z_b+\frac{Z_c(Z_e+Z_2)}{Z_e+Z_c+Z_2-Z_m} \qquad (25)$$

and $$Z_{out}=Z_e+\frac{(Z_1+Z_b)(Z_c-Z_m)}{Z_c+Z_b+Z_1} \qquad (26)$$

Figure 23:
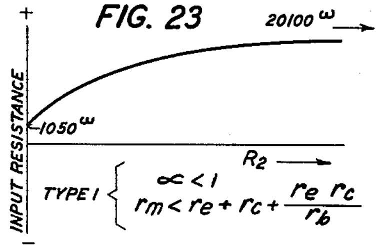
Figs. 23, 25 and 27 are graphs showing the variation of the input impedance of the network of Fig. 21 with load resistance for three representative types of transistor characteristic.
Figure 24:
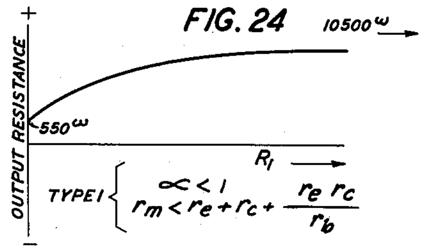
Figs. 24, 26 and 28 are graphs showing the variation of the output impedance of the network of Fig. 21 with source resistance under the same conditions.

Considering the less general case of purely resistive elements, we have on rewriting:

$$R_{in}=r_b+\frac{r_c(r_e+R_2)}{r_e+r_c+R_2-r_m} \qquad (25a)$$

and $$R_{out}=r_e+\frac{(R_1+r_b)(r_c-r_m)}{r_c+r_b+R_1} \qquad (26a)$$

when $R_1$ and $R_2$ are substituted for $Z_1$ and $Z_2$, respectively. These resistances are plotted, as functions of $R_2$ and $R_1$, respectively, (a) In Figs. 23 and 24 for a transistor of type 1, in which $$\begin{cases}\alpha<1\\ r_m<r_e+r_c+\frac{r_e r_c}{r_b}\end{cases}$$

Figure 25:
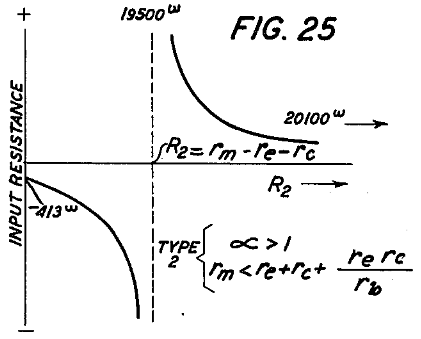
Figure 26:
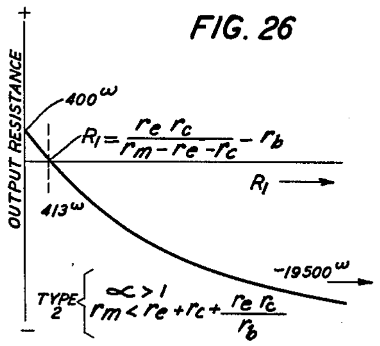

(b) In Figs. 25 and 26 for a transistor of type 2, in which $$\begin{cases}\alpha>1\\ r_m<r_e+r_c+\frac{r_e r_c}{r_b}\end{cases}$$

Figure 27:
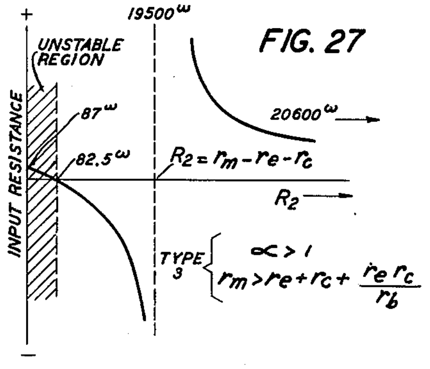
Figure 28:
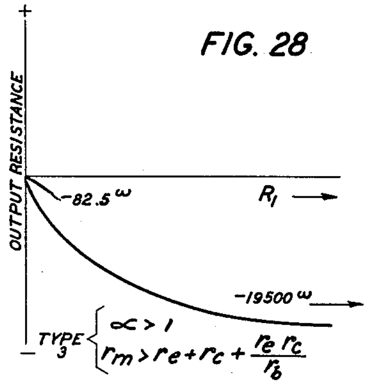

(c) In Figs. 27 and 28 for a transistor of type 3, in which $$\begin{cases}\alpha>1\\ r_m>r_e+r_c+\frac{r_e r_c}{r_b}\end{cases}$$

It will be noted that the curves of these figures are the same in many particulars as those of Figs. 15 to 20. Thus, the conditions under which $R_{in}$ reaches infinity in Figs. 25 and 27 are identical with those for which the same result arises in Figs. 17 and 19. Again, the conditions for which $R_{out}$ reaches zero in Fig. 26 are the same as those for which the like result occurs in Fig. 18. The particular valules of $R_2$ and $R_1$ which give these results are For $R_{in}=\infty$ $$R_2=r_m-r_e-r_c \qquad (27)$$

For $R_{in}=0$ $$R_2=\frac{r_b(r_m-r_c)}{r_b+r_c}-r_e$$

while intermediate values of $R_2$ gives negative input resistance.

For $R_{out}=0$ $$R_1=\frac{r_e r_c}{r_m-r_c-r_e}-r_b \qquad (28)$$

while greater values of $R_1$ give negative output resistance. It is to be noted that Equation 28 is identical with Equation 21 which gives the value of $R_1$ for which $R_{out}$ reaches zero in Fig. 18.

The network of Fig. 21, when adjusted in the manner described above, can be put to use in any of the various connections above referred to in connection with the other figures. In particular, proper adjustment of $R_2$ and $R_1$ permits their use wherever negative resistances are required.

It will be observed that in Figs. 19 and 27, those regions are indicated as being unstable in which the input impedance is positive for values of the load resistance less than that for which it is negative. To understand the nature and explanation of this instability, consider first the plot of the output impedance as a function of source resistance, Fig. 20. This is a negative resistance for any and all values of source resistance between zero and infinity. This negative resistance is of the so-called "series-type," i. e., the network of which it forms a part will be stable only if a positive resistance is connected in series with it, of which the value is greater than that of the negative resistance. By way of example, assume that the source resistance $R_1$ is zero. From Fig. 20, the output impedance then appears as a negative resistance of −1550 ohms. If a load resistance $R_2$ equal to or greater than 1550 ohms is connected to the output terminals of the transistor network, the network as a whole will be stable. If, however, the value of the external load resistance is less than 1550 ohms, the net resistance in the output circuit will be negative and the network will oscillate or sing. Addition of resistance $R_1$ in the input circuit does not cure the situation but only makes things worse, because, as shown by Fig. 20 any increase of source resistance above zero causes a larger negative value of the output impedance of the network which therefore requires a correspondingly larger value of load resistance to prevent oscillation.

Thus, if the external load resistance has a positive value, which is less in magnitude than the negative output resistance for zero input resistance, the system as a whole will be inherently unstable, even though its input impedance appears to be positive, as indicated in those parts of Fig. 19 which lie in the shaded area.

The explanation of instability in the case of Fig. 27 is the same as that of Fig. 19 except for numerical values.

Figure 29:
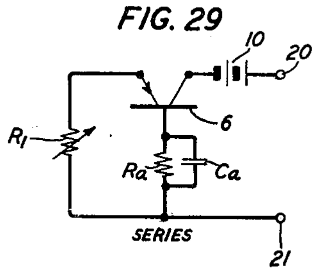
Figs. 29, 30, 31 and 33 are schematic diagrams of two terminal negative resistance devices of the series type, based on certain of the prior figures.

The negative impedance characteristics of transistor networks as described above can be turned to account by the provision of a two-terminal network including as its active element a transistor, two of whose electrodes are connected to the two network terminals while the third electrode is connected to one of the first two by way of an appropriate impedance-adjustment resistor. Thus, Fig. 29 shows a network of two external terminals 20, 21 and including a transistor 6, the latter being connected in a circuit of the grounded base configuration. The two external terminals are connected, respectively, to the collector by way of a potential source 10 and to the base by way of a resistor $R_a$ shunted by a condenser $C_a$. The emitter electrode is connected to the lower end of the resistor $R_a$ by way of a resistor $R_1$. The condenser is of sufficiently large capacitance to serve as an effective shunt at the lowest signal frequency to be encountered, so that it may be neglected in analysis and design. Thus the resistor $R_1$ is in the same position, and serves the same function, as the resistor $R_1$ of Fig. 3. The impedance and resistance of this network looking into its two terminals have the same functional forms as Equations 15 and 15*a* and, within the restrictions discussed in connection with Fig. 12, which depicts its behavior graphically, this resistance is negative for small or zero values of the resistor $R_1$.

It will be observed that the emitter bias battery of Fig. 3 has been dispensed with. It is replaced by the self-bias arrangement shown, in which, for steady currents, the voltage drop across the resistor $R_1$ due to current of the potential source 10 is overcompensated by a voltage drop across the compensating resistor $R_a$. For example, the first may be 19 volts while the second is 20 volts, measured negatively upward from the lower terminal in each case. The difference appears as a positive bias of one volt on the emitter referred to the base. This self-bias arrangement forms the subject-matter of an application of H. L. Barney, Serial No. 123.507, filed October 25, 1949. Its significance herein is that it enables the value of $R_1$ to be chosen to give a desired value to the negative resistance of the network as a whole, while still providing the correct bias by proper selection of the value of the resistor $R_a$.

The network of Fig. 29 affords a negative resistance of the so-called "series type"; i. e., one which is stable when the positive resistance of the remainder of the system of which it forms a part is in excess of a certain critical value. "Series type" and "shunt type" negative resistance characteristics are described by George Crisson in an article published in the Bell System Technical Journal, vol. 10, page 485 (1931).

Figure 30:
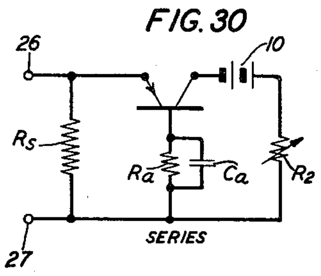

Fig. 30 shows another two-terminal network based on the input resistance of Fig. 3. Like Fig. 29, its characteristic is of the series type. Here, however, the two network terminals 26, 27 are connected to the emitter and the base, the collector being returned to the base by way of a potential source and a resistor $R_2$. A self-bias resistor $R_s$ is connected across the network terminals 26, 27 and a compensating resistor $R_a$, shunted by a condenser $C_a$, is connected in series with the base. As long as $R_s$ is large, it has no appreciable effect on the input resistance of the network whose dependence on $R_2$ is made explicit in Equation 14*a* and is depicted in Fig. 11. Proper emitter bias may be obtained by slightly overcompensating the steady voltage drop across $R_s$, by suitable choice of the magnitude of $R_a$. $R_a$, being shunted for signal frequencies by the condenser $C_a$, leaves the effective impedance of the network to be adjusted by choice of $R_2$.

Figure 31:
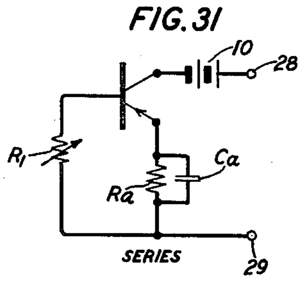

Still other series type negative resistance networks may be obtained by utilizing the output impedances of the networks of Figs. 13 and 21. As shown by Figs. 18, 20, 26 and 28, these networks give closely similar characteristics, which are negative for all values of $R_1$ under some conditions and for some values of $R_1$ under others. The functional relation between the value of the controlling resistance and of the resulting negative resistance is given in Equations 21*a* and 26*a*. Fig. 31 shows a two-terminal negative resistance network of the series type based on the output resistance of Fig. 13. Here one of the network terminals 28 is connected by way of a potential source 10 to the collector while the other 29 is connected by way of a bias-compensation resistor $R_a$, shunted as before by a condenser $C_a$ to the emitter. The base electrode is returned to the emitter by way of a resistor $R_1$, adjustment of which determines the value of the negative resistance of the network. This resistor also serves as a self-bias resistor, in a similar manner to that described in connection with Fig. 29.

The negative resistance networks of Figs. 29, 30, and 31 may be employed wherever a network having their characteristics is required. For example, any one of them may be employed as a transmission line booster, to compensate for line losses which occur due to the ohmic resistances of the line. Fig. 35 illustrates a system in which a section of transmission line having inherent loss resistances has connected in series and at intervals a plurality of negative resistance transistor networks each of which has the configuration of Fig. 31, except for the fact that the individual collector operating potential source 10 of Fig. 31 is replaced, in Fig. 35, by sources 22 and 23 at either end of the line section.

By properly selecting the value of the resistor $R_1$, the negative resistance of each network may be made to balance the positive resistance $R_L$ of a section of line of given length. In particular, and as shown by Figs. 18 and 20, the largest value of $R_1$ gives the largest negative resistance, and so permits the network to balance the greatest amount of positive resistance. For the analytical details of the analogous compensation with vacuum tube circuits, reference is made to the above-mentioned publication in the Bell System Technical Journal. With such a system signals applied to the sending end of the line by way of an input transformer 18 are repeated at the receiving end of the line, and applied to a load by way of an output transformer 19, without serious net loss. The system will be stable or not, according as the external positive resistance seen from the terminals of each of the networks is greater or less than the network's own negative resistance.

Fig. 36 shows an alternative arrangement in which a plurality of the networks of Fig. 31 are connected in shunt with a transmission line. The system is otherwise the same as that of Fig. 35 except that, because of the shunt connection of the negative resistance networks, the potential sources at the ends of the line are poled in the same sense, instead of in the opposite sense as in Fig. 35.

Figure 32:
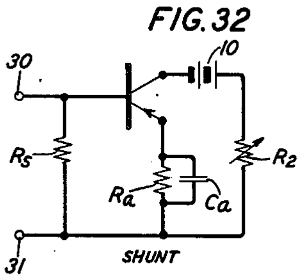
Figs. 32 and 34 are schematic diagrams of two terminal negative resistance devices of the shunt type based on others of the prior figures.

Fig. 32 shows a two-terminal transistor network based on Fig. 13 which exhibits a negative resistance characteristic of the shunt type. This means that a system of which it forms an element is stable only if a positive resistance of sufficiently small value is connected to it. The input resistor $R_s$ is of very large value and so does not appreciably alter the value of the negative resistance of the network whose functional dependence on $R_2$ is expressed in Equation 20*a* and is graphically depicted in Figs. 17 and 19 for various conditions, and for transistors of types 2 and 3, respectively.

This effective input resistance is negative under the following conditions:

$$(a)\quad (\text{Type 2})\ \alpha>1,\ r_m<r_e+r_c+\frac{r_e r_c}{r_b};\qquad (\text{Fig. 17})$$

$$0<R_2<r_m-r_e-r_c$$

$$(b)\quad (\text{Type 3})\ \alpha>1,\ r_m>r_e+r_c+\frac{r_e r_c}{r_b}\qquad (\text{Fig. 19})$$

$$\frac{r_b(r_m-r_e)}{r_b+r_e}-r_c<R_2<r_m-r_e-r_c$$

Figure 33:
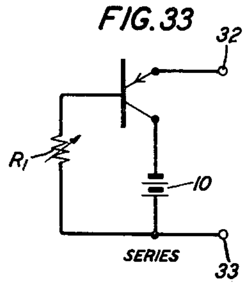
Figure 34:
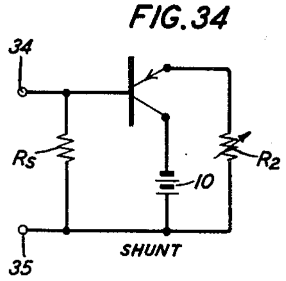

Fig. 33 shows a two-terminal transistor network of the series type, based on the output resistance of Fig. 21, and Fig. 34 shows a two-terminal transistor network of the shunt type based on the input resistance of Fig. 21. As remarked above, these impedances are closely similar, in their dependence on $R_1$ and $R_2$, respectively, to those of Fig. 13, so that, with minor adjustments of magnitude, the networks of Figs. 33 and 34 can be substituted for those of Figs. 31 and 32.

Fig. 37 shows a system in which a section of transmission line having inherent loss resistances $R_L$ has connected in series and at intervals a plurality of negative resistance transistor networks of the shunt type, those of Fig. 32 being selected by way of example. The individual operating potential source 10 of Fig. 32 is replaced by the common potential sources 36, 37 at either end of the line section.

By proper selection of the value of the resistor $R_2$, the negative resistance of each network may be made to balance the positive resistance $R_L$ of a section of the line of given length. In particular, and as shown by Figs. 17 and 19, a value just short of that for which $R_{in}=\infty$ gives the largest negative value of $R_{in}$. The controlling resistance in the collector-to-emitter path has connected in series with it a blocking condenser $C_1$. Operating potential is supplied to the collector by way of a resistor $R_p$ and is prevented from reaching the base electrode by a blocking condenser $C_2$. Correct bias between base and emitter is secured by selection of the values of the self-bias resistor $R_a$ and of the compensating resistor $R_a$ of which the latter is by-passed by a condenser $C_a$.

Fig. 38 shows an alternative arrangement in which a plurality of the networks of Fig. 32 are connected in shunt with a transmission line. Auxiliary elements, provided to enable the networks to operate on a common collector potential supply, are numbered similarly to those of Fig. 37, and serve like purposes. The system is otherwise the same as Fig. 37 except that, because of the shunt connection of the negative resistance networks, the potential source at the ends of the line are poled in the same sense, instead of in the opposite sense as in Fig. 37.

In the foregoing figures, certain elements are included for the sake of generality. This does not mean that their presence is essential to the operation of the system. Thus, for example, in Fig. 35, each of the negative resistance networks includes a variable resistor $R_1$ and a self-bias resistor $R_a$, shunted by a condenser $C_a$. In special cases the particular values of these elements may be zero. Thus, with respect to the resistor $R_1$, it will be noted by reference to Fig. 20 that with a transistor of type 3 having the characteristic values for its parameters which are listed above for illustrative purposes, the transistor network is characterized by a negative resistance of 1550 ohms. Thus, the resistor $R_1$ may be omitted entirely, in which case the negative resistance of the transistor network will balance a balance positive resistance of 1550 ohms. Alteration of the parametric values of the transistor itself, as by a change in operating condition, will enable the network to balance the positive resistances of different numerical values.

Figure 39:
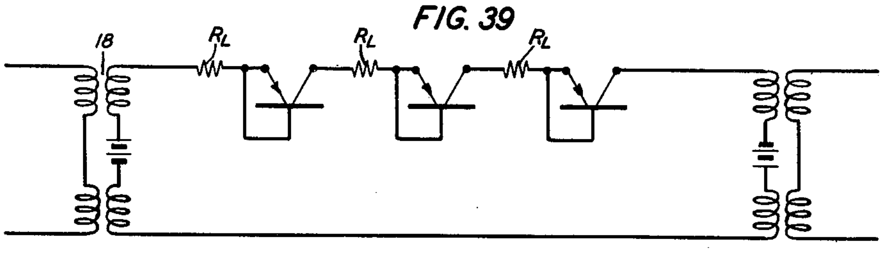
Fig. 39 is a schematic diagram of a modification of Fig. 35.

Fig. 39 shows a section of transmission line having intrinsic loss resistance represented by resistors $R_L$ and compensating negative resistances provided by transistor networks which are based on the network of Fig. 31 with the adjustment value of the resistor $R_1$ reduced to zero; i. e., eliminated entirely.

Furthermore, in many cases, the small positive bias for the emitter electrode may be omitted entirely without greatly affecting the result. Indeed, in the case of some transistors it has been found that the best operating conditions are obtained without the use of any external bias source on the emitter electrode. When the bias to be employed is zero, and the self-bias resistor $R_a$ of Fig. 35 has thus been eliminated, the by-pass condenser $C_a$ may, of course, be dispensed with too. This leads to the highly simplified circuit arrangement of each of the transistor networks of Fig. 39, which is simple and inexpensive from the standpoint of the fabrication and compact from the standpoint of required space. It lends itself conveniently to use with a transmission line or a coaxial cable in which it is desired to incorporate such negative resistance boosters in the course of manufacture.

Various similar simplifications and special cases of the networks earlier described will suggest themselves to those skilled in the art.

Reference is made to a related application, Serial No. 58,684, filed November 6, 1948, and to two divisions thereof, both of which were filed on November 15, 1949, namely, application Serial No. 127,439, now Patent 2,550,518, issued April 24, 1951, and application Serial No. 127,440, now Patent 2,541,322, issued February 13, 1951.

What is claimed is:

1. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m > r_e + r_c + \frac{r_e r_c}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, one of said two terminals being directly connected to said collector, and the other of said two terminals being directly connected both to said base and to said emitter, whereby the impedance presented by said network at said terminals is negative.

2. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m > r_e + r_c + \frac{r_e r_c}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, said two terminals being connected to said base electrode and said emitter electrode, and a resistor $R_2$ interconnecting said base with said collector, said resistor being proportioned in accordance with the formula $$R_2 < \frac{r_b(r_m - r_e)}{r_e + r_b} - r_c$$

to cause the impedance presented by said network at said terminals to have a desired negative value.

3. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m > r_e + r_c + \frac{r_c r_e}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, said two terminals being connected to said base electrode and said collector electrode, and a resistor $R_1$ interconnecting said base with said emitter, said resistor being proportioned in accordance with the formula $$R_1<\frac{r_b(r_m-r_c)}{r_c+r_b}-r_e$$

to cause the impedance presented by said network at said terminals to have a desired negative value.

4. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m>r_e+r_c+\frac{r_er_c}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, said two terminals being connected to said base electrode and said emitter electrode, and a resistor $R_2$ interconnecting said collector and said emitter, said resistor being proportioned in accordance with the formula $$\frac{r_b(r_m-r_e)}{r_b+r_e}-r_c<R_2<r_m-r_e-r_c$$

to cause the impedance presented by said network at said terminals to have a desired negative value.

5. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is breater than unity, the transistor parameters having values such that $$r_m>r_e+r_c+\frac{r_er_c}{r_b}$$

wnere $r_e$=emitter resistance of the transistor
$r_b$=base resistance of the transistor
$r_c$=collector resistance of the transistor
$r_m$=mutual resistance of the transistor means including an energy source for establishing said proper bias conditions, said two terminals being connected to said base electrode and said collector electrode, and a resistor $R_2$, interconnecting said emitter electrode and said collector electrode, said resistor being proportioned in accordance with the formula $$\frac{r_b(r_m-r_c)}{r_b+r_c}-r_e<R_2<r_m-r_e-r_c$$

to cause the impedance presented by said network at said terminals to have a desired negative value.

6. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m<r_e+r_c+\frac{r_er_c}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, one of said terminals being connected to said base electrode, the other of said terminals being connected to one of said two other electrodes, and a resistor $R_2$ interconnecting said collector with said emitter, said resistor being proportioned in accordance with the formula $$R_2<r_m-r_e-r_c$$

to cause the impedance presented by said network at said terminals to have a desired negative value.

7. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m<r_e+r_c+\frac{r_er_c}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, said two terminals being connected to said emitter electrode and said collector electrode, and a resistor $R_1$ interconnecting said base electrode with one of said two other electrodes, said resistor being proportioned in accordance with the formula $$R_1>\frac{r_er_c}{r_m-r_e-r_c}-r_b$$

to cause the impedance presented by said network at said terminals to have a desired negative value.

8. A network having a single pair of accessible terminals which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, the transistor parameters having values such that $$r_m > r_e + r_e + \frac{r_e r_c}{r_b}$$

where $r_e$=emitter resistance of the transistor
$r_b$=base resistance of the transistor
$r_c$=collector resistance of the transistor
$r_m$=mutual resistance of the transistor means including an energy source for establishing said proper bias conditions, said two terminals being connected to said emitter electrode and said collector electrode and a resistor $R_1$ interconnecting said base electrode with one of said two other electrodes, said resistor being proportioned in accordance with the formula $$R_1 \geqslant 0$$

to cause the impedance presented by said network at said terminals to have a desired negative value.

HAROLD L. BARNEY.

REFERENCES CITED

The following references are of record in the file of this patent:

UNITED STATES PATENTS

| Number | Name | Date |
|---|---|---|
| 1,877,140 | Lilienfeld | Sept. 13, 1932 |
| 1,949,383 | Weber | Feb. 27, 1934 |
| 2,476,323 | Rack | July 19, 1949 |
| 2,517,960 | Barney | Aug. 8, 1950 |
| 2,524,033 | Bardeen | Oct. 3, 1950 |
| 2,524,035 | Bardeen | Oct. 3, 1950 |